March 16, 1965     J. L. MILANA     3,173,630
AIRCRAFT LANDING GEAR EMERGENCY HYDRAULIC SYSTEM
Filed Nov. 7, 1961     2 Sheets-Sheet 1
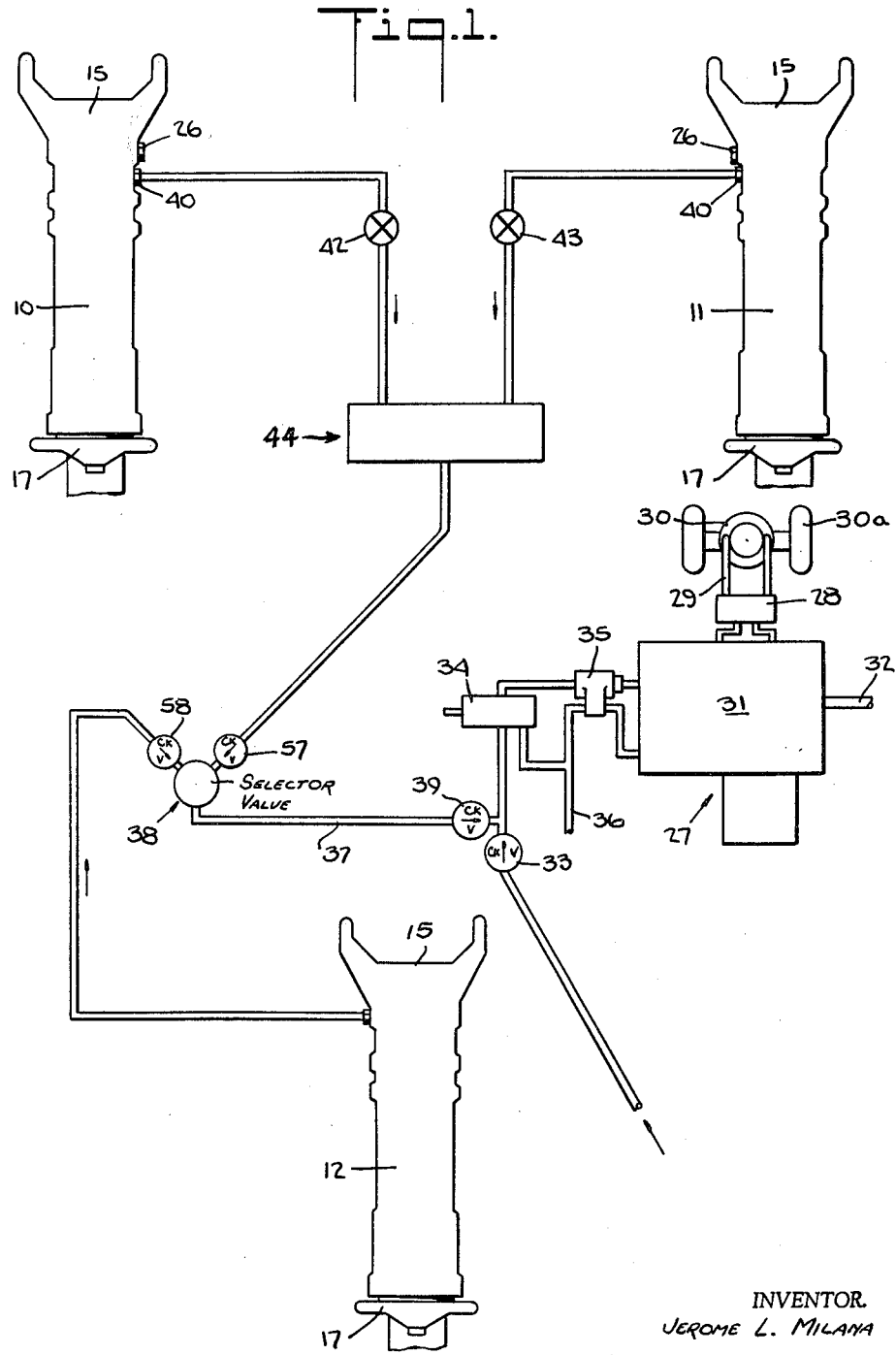
INVENTOR.
JEROME L. MILANA
BY
ATTORNEYS March 16, 1965  J. L. MILANA  3,173,630
AIRCRAFT LANDING GEAR EMERGENCY HYDRAULIC SYSTEM
Filed Nov. 7, 1961  2 Sheets-Sheet 2
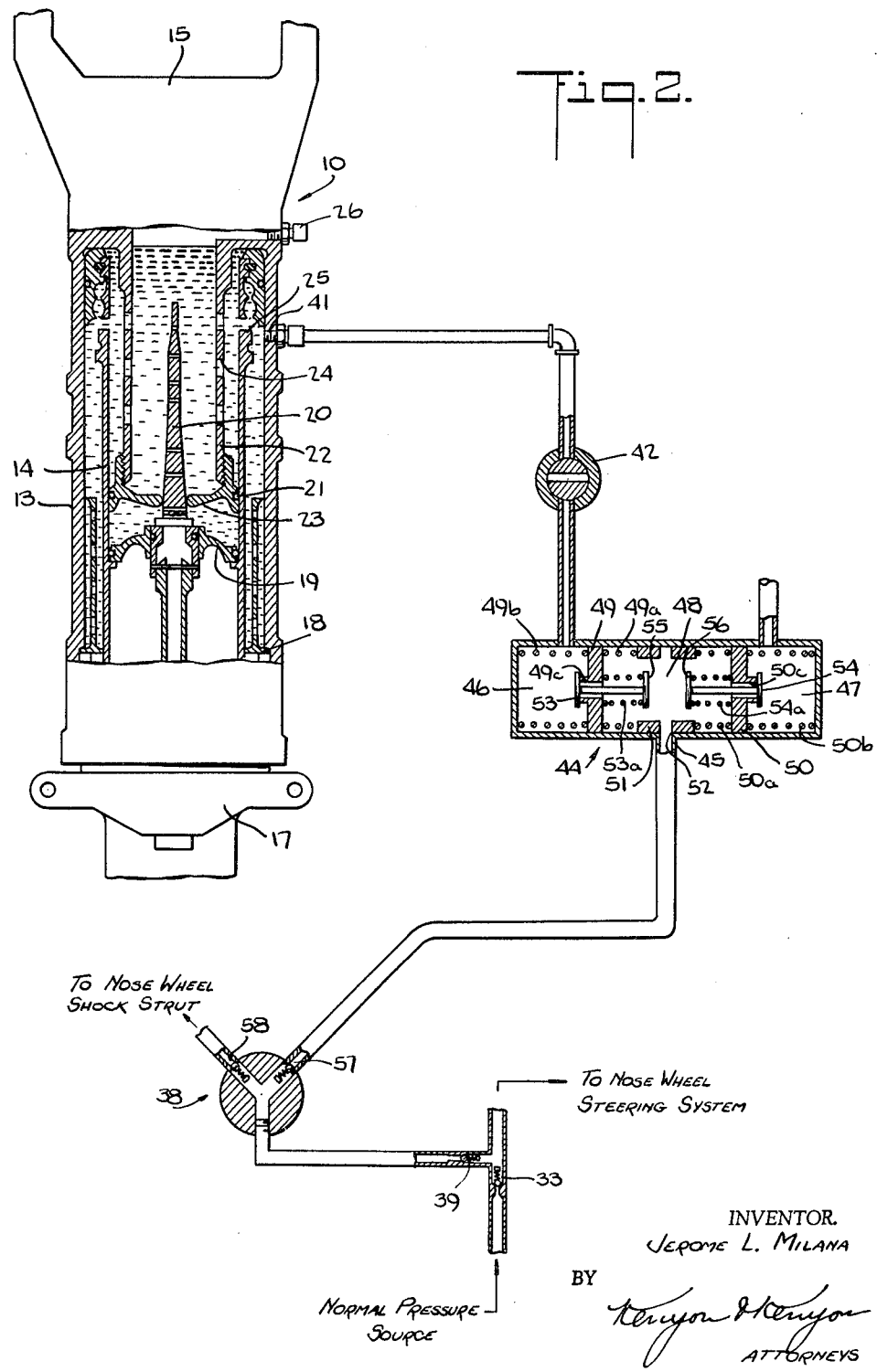
INVENTOR.
Jerome L. Milana
BY
Kenyon & Kenyon
ATTORNEYS

United States Patent Office 3,173,630
Patented Mar. 16, 1965

3,173,630
AIRCRAFT LANDING GEAR EMERGENCY
HYDRAULIC SYSTEM
Jerome L. Milana, 445 Minorca Ave., Coral Gables, Fla.
Filed Nov. 7, 1961, Ser. No. 150,742
5 Claims. (Cl. 244—50)

This invention relates to a system for supplying hydraulic pressure when a failure of the normal source of pressure has occurred.

In both commercial and military aircraft, hydraulic pressure is employed to operate various accessories and equipment. In order to minimize the effect of a failure in a hydraulic system, it is normally divided into various branches, each of which may be either self-contained or isolated from the others, so that the failure of one branch leaves the rest still operable. Normally, the source of hydraulic pressure is a pump which can deliver fluid to be stored under operating pressure in an accumulator. In some installations, provision is made for manual pumping whenever the power driven pumps fail to operate. However, for the case where leakage causes a substantial loss of the hydraulic fluid in a given branch of the system, that branch becomes inactive and can no longer serve its function.

Some of the devices powered by hydraulic pressure can be operated by manual force in the case of the failure in the hydraulic system. However, where the required operating forces are in excess of human capabilities, loss of hydraulic pressure makes that particular device inoperable. For example, on large aircraft having a tricycle landing gear, it is conventional to employ hydraulic pressure to steer the nose wheel of the landing gear so that precise directional control of the aircraft may be maintained once it is on the runway. If, because of a loss of hydraulic pressure in flight, the crew of a large aircraft is required to land it without nose wheel steering, the completion of a safe flight may be jeopardized. Large aircraft especially of the jet type which touch down at very high landing speeds can be put into a dangerous condition if the pilot must rely upon the aerodynamic forces of the control surfaces or upon the alternate application of the brakes of the main landing gear in order to maintain directional control on the ground.

Attempts to minimize the effect of a leak in the hydraulic system include the provision of check valves to prevent large losses of fluid, the use of a plurality of pumps to get greater reliability, and the use of various valving arrangements which enable the fluid to be directed from one branch to another. These safeguards, however, are often of no benefit since sufficient leakage may render the system, or at least a branch of it, inoperable.

It is an object of this invention to provide a source of emergency hydraulic pressure from normally self-contained hydraulic components such as landing gear shock struts.

It is a further object of this invention to provide a valving arrangement for supplying emergency hydraulic pressure from a normally self-contained hydraulic component to a device in the hydraulic system.

Another object of this invention is to derive an emergency source of hydraulic pressure from a plurality of normally self-contained hydraulic components in such a manner that the pressure level is maintained at an operable valve, regardless of the pressure fluctuations in one or more of the plurality of components.

One embodiment of this invention comprises a pressured fluid system having a first pressured fluid and means adapted for actuating a load in response to the first pressured fluid. The system further includes second means adapted for actuating another load. The second actuating means contains a second pressured fluid independent of the first fluid. The system also has means for selectively connecting the first actuating means to one of the first pressured fluid or the second pressured fluid so that the first actuating means is insured of receiving pressured fluid after the loss of either of the pressured fluids.

In the system hydraulic fluid under pressure is normally supplied to an actuator. Another actuating device containing hydraulic fluid under pressure is available and the pressured fluid of this device is independent of that of the first actuator. Upon loss of the hydraulic fluid to the actuator, a valving device is provided for connecting the actuator to the other actuating device. In this manner during an emergency condition, the actuator may be maintained operative even after failure of the hydraulic pressure normally supplied to it.

More specifically the embodiment of the invention rests in the combination of a hydraulic actuator which can be connected to the pressured fluid within the landing gear supporting means of an aircraft whenever the normal hydraulic pressure supply to the actuator has failed. Due to the quantity of pressured fluid stored within the landing gear system, it is sufficient to operate the actuator for an emergency condition of limited duration.

A sub-combination of the invention is found in an equalizing check valve device, which is adapted to transmit and combine pressured fluid from at least two separate sources, so long as there is a predetermined level of pressure in each of the sources. The equalizing check valve is adapted for metering the hydraulic fluid from the main struts of an aircraft landing gear system into a hydraulic actuator whenever the normal hydraulic supply has failed.

Other objects and further features of this invention will become apparent from the following specification and the accompanying drawings, wherein FIG. 1 is a block diagram of an aircraft landing gear steering system embodying the invention;

FIG. 2 is a fragmentary sectional view showing the landing gear strut and the equalizing check valve used in adapting the strut as a source of emergency hydraulic pressure.

Briefly, the primary embodiment of the combination of this invention comprises a landing gear steering system having a first means for actuating a load, the steering load, in response to pressured fluid which is provided with an emergency source of hydraulic pressure from the landing gear shock struts, that is second means for actuating another load independent of said load. The tricycle landing gear of an aircraft may include main gear shock struts 10 and 11 and nose gear shock strut 12 (FIG. 1) which are second means for actuating another load, that is the load withstanding the substantially vertical force component of the aircraft with respect to the ground when the aircraft is fully or partially supported by the ground. For the main or nose gear, a shock strut may be of the oleo type which is shown in section in FIG. 2. The shock strut or means for supporting the aircraft on the wheels or landing gear includes telescoping outer cylinder 13 and inner cylinder 14. Upper mount 15 extending from the upper portion of outer cylinder 13 serves as the attachment of the strut to the air frame, along a pivotal axis which enables the strut to be swung within the aircraft during flight. Lower mount 17 which extends downwardly from the lower portion of inner cylinder 14 serves as the attachment point for the wheels of the landing gear.

The lower inner portion of outer cylinder 13 is provided with sealing ring 18 attached thereto which is adapted to slide along the outer surface of inner cylinder 14 whenever there is relative motion between the cylinders. In the interior of inner cylinder 14, there is fixedly attached end plate 19 from the center portion of which extends orifice rod 20 in an upward direction. Piston ring 21 is in sliding engagement with the inner surface of inner cylinder 14 and it is supported by piston rod 22 which is attached at its upper end to the upper portion of outer cylinder 13. Piston rod 22 is of a substantially cylindrical form surrounding the axis of orifice rod 20 and it supports at its lower end portion orifice plate 23 which forms a variable orifice with the orifice rod. Upon charging the shock strut with hydraulic oil, the oil enters into the cavities between orifice plate 23 and end plate 19 as well as the cavity within piston rod 22. Openings 24 in piston rod 22 enable the hydraulic oil to pass freely into the region between the piston rod and the inner cylinder and also to travel beyond upper end 25 of the inner cylinder into the region adjacent the outer cylinder.

In FIG. 2 shock strut 10 is shown completely compressed with inner cylinder 14 rested within outer cylinder 13. In order that the shock strut may serve as a spring as well as a shock absorbing device, a predetermined quantity of hydraulic fluid is first admitted into the strut and then it is charged with pressurized gas through fitting 26. The pressured gas causes the inner cylinder to move away from the outer cylinder so that the strut assumes its extended or elongated position. During a landing approach, the unloaded strut would be in the extended position so that end plate 19 would be displaced downwardly from orifice plate 23 as viewed in FIG. 2. As the wheels touch the ground upon landing, the weight of the aircraft is transferred to the shock struts with the result that the weight of the aircraft tends to compress the gas contained within the strut over the hydraulic fluid. During compression of the gas, inner cylinder 14 moves upwardly with the result that end plate 19 forces the hydraulic fluid in the cavity formed between it and orifice plate 23 to pass through the orifice formed between the plate and the orifice rod. The varying cross-section of orifice rod 20 provides minimum damping when the strut is in its elongated position and increasing damping as the strut is compressed. As the weight of the aircraft is transferred to the strut and the strut compresses, the pressure within it continues to rise to a level at which the weight of the aircraft can be supported and the strut approaches an equilibrium condition. During a landing, the struts are subjected to an oscillatory type of loading because of the many variables encountered such as bouncing of the landing wheels, irregularities of the runway, variations in lift upon the aircraft, and swerving and swinging of the aircraft during the landing ground roll.

To facilitate handling of the aircraft on the ground, the landing gear is oftentimes provided with a power steering system. In the case of tricycle landing gears, the nose wheel assembly 30a is normally provided with a device such as hydraulic steering system 27, which includes first means for actuating a load, the steering load, in response to pressured fluid or hydraulic motor 28, connected by couplings 29 to steering collar 30 of the nose landing gear. The pilot's manual steering commands are inserted into hydraulic control valve 31 by means of control rod 32.

Hydraulic pressure or a first pressured fluid from means for providing a first pressured fluid or a source indicated by the arrow in FIG. 1 is delivered through a first check valve 33, shut-off valve 34 and fitting 35 into control valve 31. Return line 36 connects shut-off valve 34 as well as hydraulic control 31 to the sump side of the hydraulic system. Under normal conditions, flow of the hydraulic fluid is blocked from line 37 leading to selector valve 38 by the closing of the line by a second check valve 39. Thus the source of hydraulic pressure or pressured fluid is independent of the pressured fluid in the supporting means.

During landing, failure of the hydraulic supply to steering system 27 can place the aircraft in a dangerous condition since at that point the pilot must rely upon steering by aerodynamic forces while at high speed and steering by selective braking of the main landing gear wheels during the later phases of the landing ground roll. With the aircraft resting upon the landing gear, the second pressured fluid or the hydraulic fluid within the shock struts or second actuating means is pressurized at a considerable pressure level. Since the landing gear shock struts collectively contain a large quantity of pressured hydraulic fluid, they can serve as an emergency supply of hydraulic pressure.

A shock strut such as shock strut 10 (FIG. 2) can be considered a second actuating means in the sense that it is a piston and cylinder device containing a pressured fluid and adapted to exert force upon the structure to which it is attached. Shock struts 10 and 11 or a plurality of additional means each for actuating a different one of a plurality of additional loads are provided with fittings 40 connected to passages 41 which are in communication with the pressured hydraulic fluid within the struts. The plurality of loads are the plurality of substantially vertical force components which are supported by the struts and which are independent of the steering load. Struts 10 and 11 are connected by means of shut-off valves 42 and 43, respectively, to the opposite end portions of equalizing check valve 44 (FIG. 2) or the means for selectively connecting the first actuating means, the hydraulic motor 28, to the second actuating means, the shock struts 10 and 11. The purpose of the equalizing check valve is to combine the pressured fluids from each of the shock struts as the function of the pressure of each in order to produce a combined pressure at the discharge port 45 of the equalizing check valve. The equalizing check valve includes chambers 46 and 47 which are connected to struts 10 and 11, respectively. The other ends of the chambers are adjacent to the discharge portion of the equalizing check valve which exits in discharge port 45. Chambers 46 and 47 contain pistons 49 and 50, respectively, which are restrained in a substantially central location within their respective chambers, by centering springs 49a and 49b and 50a and 50b, respectively. Stops 51 and 52 are located adjacent to the ends of chambers 46 and 47, respectively adjacent to discharge portion 48.

Pistons 49 and 50 include valves 53 and 54, respectively, which extend through openings 49c and 50c, respectively. Springs 53a and 54a contain valves 53 and 54, respectively. When shut-off valves 42 and 43 are in the open position, the pressure from the shock struts is transmitted to the chambers of equalizing check valve 44. The application of pressure to pistons 49 and 50 results in the compression of centering springs 49a and 50a, respectively. If the pressure from the shock struts is of a predetermined level, sufficient to compress the centering springs beyond a predetermined point, end portions 55 and 56 of valves 53 and 54, respectively, contact one another. Beyond the point of contact of the end portions, further movement of pistons 49 and 50 will result in the opening of valves 53 and 54. At this point, the hydraulic fluid passes through openings 49c and 50c and combines to form a pressure level in discharge portion 48. Upon disequal pressure conditions between the struts, the movement of the pistons will be disequal with the piston exposed to the higher pressure level moving through the greater distance. However, so long as end portions 55 and 56 contact one another, valves 53 and 54 will open and transmit hydraulic pressure into the discharge portion of the valve.

In case there is no pressure delivered from one of the shock struts while the other is at some pressure level, the piston exposed to the pressure level will move inwardly in the normal manner. However, the piston to which no strut pressure is applied will remain substantially stationary under the urging of the centering springs. As the one piston moves inwardly, the end portion of its metering valve remains disengaged from that of the other valve. If the pressure level is of sufficient magnitude, the movement of the piston will ultimately be terminated by engagement of the piston with the stop adjacent to it. The spacing of the stops is of such a magnitude that the end portion of the activated piston and the deactivated piston still remain out of engagement so that no pressured fluid can be delivered to the discharge side of the equalizing check valve under this condition.

Selector valve 38 enables the pilot to connect shock struts 10–12 to the hydraulic steering system upon demand. The combined pressure from equalizing check valve 44 can pass into selector valve 38 through check valve 57. Pressurized fluid from nose wheel shock strut 12 can pass into selector valve 38 through check valve 58. If the hydraulic connection through the nose wheel shock strut should fail, check valve 58 prevents any leakage in this direction. On the other hand, if there is a failure in the equalizing check valve or in shock struts 10 and 11, check valve 57 prevents flow in that direction. It should be noted that by means of shut-off valves 42 and 43, pressure can be blocked from shock struts 10 and 11 even though a failure has not occurred so that only the nose gear strut would be available to supply emergency pressure.

Operation

It is assumed that prior to landing, a failure of the hydraulic system which supplies hydraulic pressure to the nose wheel steering system has occurred. It is further assumed that, because of the condition of the landing field, the pilot makes the decision that power steering will be necessary during the landing roll and that therefore emergency hydraulic pressure for the landing gear steering system is required. At this point, the pilot can open shut-off valves 42 and 43 which may be ganged together for a single operation. Selector valve 38 would then be set in a position which connects shock struts 10–12 to check valve 39 leading to the nose wheel steering system.

During the landing, as soon as the wheels contact the runway, a portion of the weight of the aircraft is immediately transmitted to the shock struts, so that a compression of them increases the hydraulic pressure within the struts. Assuming that the hydraulic pressure of struts 10 and 11 is of a sufficient level and substantially equal, fluid will be transmitted through equalizing check valve and on through selector valve 38 to check valve 39. Since the main hydraulic source of pressure has failed, the transmission of emergency pressure through check valve 39 will close check valve 33 so that the pressured fluid is routed to the nose wheel steering system 27. During the ground roll, variations in the surface of the runway, cross wind conditions or other factors contributing to sway or swerving of the aircraft, will result in disequal pressures in struts 10 and 11. The action of the equalizing check valve will then cause the transfer of a greater quantity of fluid from the strut subjected to the high pressure so that the pressure in the two struts will tend to be equalized. At the same time that fluid is delivered from struts 10 and 11, nose wheel shock strut 12 can deliver pressured fluid through check valve 58, selector valve 38 to check valve 39 leading to the nose wheel steering system.

The bleeding of hydraulic fluid from the landing gear shock struts during the ground roll will result in a gradual lowering of the aircraft with respect to the ground due to the contraction of the shock struts. This effect can be of advantage since it serves to lower the center of gravity of the aircraft and at the same time to increase the aerodynamic drag due to ground effects. In this way, the craft becomes more stable and the increased drag tends to slow down its forward motion. If sufficient fluid is removed from the shock struts, they will ultimately reach their mechanical bottoming position, at which point no further travel can occur. It should be noted that other hydraulic components connected with landing operations, such as brakes, engine reverse thrust actuators, wing spoiler actuators, etc., can be provided with pressure connections similar to those for the nose wheel steering system so that they can be provided with emergency hydraulic pressure during landing.

The present invention may be embodied in other specific forms not described herein without departing from the spirit and essential attributes thereof. It is therefore desired that the present embodiments be considered in all respects illustrative and not restrictive, reference being had to the appended claims rather than to the foregoing description to indicate the scope of the invention.

What is claimed is:

1. In an aircraft having a plurality of landing wheels, a pressured fluid system comprising a plurality of means for supporting said aircraft on said wheels, each of said supporting means containing pressured fluid, the pressure of said fluid in each of said supporting means being responsive to the portion of the weight of the aircraft applied thereto, means for combining said pressured fluid from said plurality of supporting means as a function of the pressure of each of said pressured fluids in said supporting means, a source of pressured fluid independent of the pressured fluid in said supporting means, means for actuating a load in response to pressured fluid, and means for selectively connecting said actuating means to one of said combining means and said pressured fluid source, whereby said actuating means can actuate said load in response to one of said pressured fluid in said supporting means and said pressured fluid of said source.

2. A pressured fluid system in accordance with claim 1 in which said means for selectively connecting said actuating means to one of said combining means and said independent pressured fluid source includes a first check valve disposed between said pressured fluid source and said actuating means, said first check valve enabling said independent pressured fluid to flow toward said actuating means, and a second check valve disposed between said combining means and said actuating means, said second check valve enabling said combined pressured fluid to flow only from said combining means toward said actuating means.

3. In an aircraft having a plurality of landing wheels, the combination comprising a plurality of means for supporting the aircraft on said wheels, each of said supporting means including pressured fluid, the pressure of said fluid in each of said supporting means being responsive to the portion of the weight of the aircraft applied thereto, a source of pressured fluid independent of the pressured fluid in said supporting means, means for steering at least one of said landing wheels in response to pressured fluid, and means for selectively connecting said steering means to one of said independent pressured fluid source and said supporting means, whereby said steering means can be actuated in response to one of said pressured fluid of said supporting means or said pressured fluid of said source.

4. In an aircraft having a plurality of main landing wheels and a nose wheel, the combination comprising a plurality of shock struts for supporting said aircraft with respect to said wheels, said shock struts having pressured gas and liquid therein, the pressure of said gas and liquid in each of said struts being responsive to the portion of the weight of the aircraft applied thereto, a source of pressured liquid independent of the liquid in said struts, means for steering said nose wheel during normal conditions in response to said independent pressured liquid, means for combining the pressured liquid in each of the struts for said main wheels as a function of the pressure of each of the struts, and means for selectively connecting said pressured liquid of said source to said steering means during normal conditions and said combined pressured liquid and the pressured liquid from said nose wheel strut to said steering means during emergency conditions, whereby said steering means is insured of receiving pressured liquid during normal and emergency conditions.

5. In an aircraft having a landing gear, a fluid system comprising means for supporting the aircraft on the landing gear, said means for supporting the aircraft containing fluid at a pressure responsive to the portion of the weight of the aircraft applied thereto, and means for actuating a load independent of the supporting of the aircraft in response to pressured fluid, said means for actuating a load being connected to said means for supporting the aircraft, whereby the pressured fluid of said supporting means serves as a source of pressured fluid to said actuating means.

References Cited by the Examiner

UNITED STATES PATENTS

| 1,847,491 | 3/32 | Messier | 244—104 |
| 1,851,623 | 3/32 | Flader | 244—104 |
| 1,853,232 | 4/32 | Schwarz | 244—104 |
| 2,200,578 | 5/40 | Mahon | 137—99 |
| 2,519,522 | 8/50 | Wells | 244—104 |
| 2,953,150 | 9/60 | Davis | 137—99 |
| 3,002,791 | 10/61 | Pease | 303—2 |
| 3,042,345 | 7/62 | Holland | 244—104 |

MILTON BUCHLER, *Primary Examiner.*

EMILE PAUL, ANDREW H. FARRELL, *Examiners.*